(12) United States Patent
Sawada et al.

(10) Patent No.: US 9,358,825 B1
(45) Date of Patent: Jun. 7, 2016

(54) GRAVURE PRINTING PLATE AND METHOD OF MANUFACTURING MULTILAYER CERAMIC ELECTRONIC COMPONENT

(71) Applicant: Murata Manufacturing Co., Ltd., Nagaokakyo-shi, Kyoto-fu (JP)

(72) Inventors: Takashi Sawada, Nagaokakyo (JP); Yasuyuki Shimada, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 15/002,562

(22) Filed: Jan. 21, 2016

(30) Foreign Application Priority Data

Feb. 5, 2015 (JP) .................................. 2015-021585

(51) Int. Cl.
*B41N 1/00* (2006.01)
*B41C 1/00* (2006.01)
*B41N 1/16* (2006.01)

(52) U.S. Cl.
CPC ... *B41N 1/00* (2013.01); *B41C 1/00* (2013.01); *B41N 1/16* (2013.01)

(58) Field of Classification Search
CPC ..................................... B41N 1/06; B41N 1/00
See application file for complete search history.

(56) References Cited

U.S. PATENT DOCUMENTS

2015/0113801 A1* 4/2015 Cao ........................... B41C 1/00
29/825

FOREIGN PATENT DOCUMENTS

JP 2009-218363 A 9/2009
JP 2012-071533 A 4/2012

\* cited by examiner

*Primary Examiner* — Joshua D Zimmerman
(74) *Attorney, Agent, or Firm* — Keating & Bennett, LLP

(57) ABSTRACT

In a gravure printing plate, a ratio of an area ratio of part of a second portion excluding second protrusions to the second portion, to an area ratio of a part of a portion excluding first protrusions to a portion that is part of a first portion that is located closer to the second portion than a line-shaped portion of a first protrusion located closest to the second portion ((an area ratio of the part of the second portion excluding the second protrusions to the second portion)/(an area ratio of the part of the portion excluding the first protrusions to the portion, the portion being a part of the first portion that is located closer to the second portion than the line-shaped portion of the first protrusion located closest to the second portion)) is about 0.3 or more and about 0.9 or less.

14 Claims, 13 Drawing Sheets

GRAVURE PRINTING PLATE AND METHOD OF MANUFACTURING MULTILAYER CERAMIC ELECTRONIC COMPONENT

BACKGROUND OF THE INVENTION

1. Field of the Invention

The present invention relates to a gravure printing plate and to a method of manufacturing a multilayer ceramic electronic component using the gravure printing plate.

2. Description of the Related Art

When manufacturing a multilayer ceramic capacitor, a technique in which conductive paste layers for forming inner electrodes are printed by using a gravure printing plate is known (for example, refer to Japanese Unexamined Patent Application Publication No. 2012-71533).

As illustrated in Japanese Unexamined Patent Application Publication No. 2009-218363, a technique has also been considered in which conductive paste layers, which are for forming inner electrodes of a multilayer ceramic electronic component that has inner electrodes with opposing portions and lead-out portions of different widths, are printed using a gravure printing plate.

As a result of diligent research, the present inventors discovered that, when conductive paste layers, which are for forming the inner electrodes of a multilayer ceramic electronic component that has inner electrodes with opposing portions and lead-out portions of different widths, are printed using a gravure printing plate, the inner electrodes cannot be suitably printed and it is not possible to manufacture a multilayer ceramic electronic component having the desired electrical characteristics.

SUMMARY OF THE INVENTION

Preferred embodiments of the present invention provide a gravure printing plate with which a conductive paste layer including a plurality of connected portions of different widths is able to be suitably printed.

A gravure printing plate according to a preferred embodiment of the present invention includes a recess, into which a conductive paste is to be charged, in an outer circumferential surface thereof. The recess includes a first portion having a rectangular or substantially rectangular shape and extending in a rotational direction, and a second portion that extends in an axial direction from a portion of an edge of the first portion extending in the rotational direction. At least two or more first protrusions are provided inside the first portion and a second protrusion is provided inside the second portion. The first protrusions each include a line-shaped portion that extends in the rotational direction.

A ratio of an area ratio of part of the second portion excluding the second protrusion to the second portion, to an area ratio of part of a portion excluding the first protrusions to a portion that is part of the first portion that is located closer to the second portion than the line-shaped portion of a first protrusion located closest to the second portion, that is, ((an area ratio of part of the second portion excluding the second protrusion to the second portion)/(an area ratio of part of the portion excluding the first protrusions to the portion, the portion being part of the first portion that is located closer to the second portion than the line-shaped portion of the first protrusion located closest to the second portion)) preferably is about 0.3 or more and about 0.9 or less, for example.

Consequently, conductive paste is not excessively charged into the second portion and spreading of the conductive paste layer in the second portion at the time of printing is prevented.

Therefore, a conductive paste layer including a plurality of connected portions of different widths is suitably printed by using the gravure printing plate according to the present preferred embodiment of the present invention.

In a gravure printing plate according to a preferred embodiment of the present invention, it is preferable that a ratio of an area ratio of a portion of an upstream half excluding the second protrusion to the upstream half, the upstream half being half of the second portion located upstream of a center line in the rotational direction, to an area ratio of a portion of a downstream half excluding the second protrusion to the downstream half, the downstream half being half of the second portion located downstream of the center line in the rotational direction, that is, ((the area ratio of the portion of the upstream half excluding the second protrusion to the upstream half, the upstream half being the half of the second portion located upstream of the center line in the rotational direction)/(the area ratio of the portion of the downstream half excluding the second protrusion to the downstream half, the downstream half being the half of the second portion located downstream of the center line in the rotational direction)) be greater than 1, for example.

It is preferable that the ratio of the area ratio of the portion of the upstream half excluding the second protrusion to the upstream half, the upstream half being the half of the second portion located upstream of a center line in the rotational direction, to the area ratio of the portion of the downstream half excluding the second protrusion to the downstream half, the downstream half being the half of the second portion located downstream of the center line in the rotational direction, that is, ((the area ratio of the portion of the upstream half excluding the second protrusion to the upstream half, the upstream half being the half of the second portion located upstream of the center line in the rotational direction)/(the area ratio of the portion of the downstream half excluding the second protrusion to the downstream half, the downstream half being the half of the second portion located downstream of the center line in the rotational direction)) be 4 or less, for example.

In this case, a greater amount of conductive paste is charged into a portion of the second portion located upstream of the center of the second portion in the rotational direction and, at the time of printing, the conductive paste easily flows from upstream of the center of the second portion to downstream of the center of the second portion and from the second portion to the first portion. Therefore, the conductive paste layer is suitably printed with high form accuracy without occurrence of spreading or insufficient coverage at connection portions between the first portion and the second portion including a plurality of connected portions of different widths.

In a gravure printing plate according to a preferred embodiment of the present invention, the second protrusion may include a plurality of protrusions that extend in the axial direction and are arranged in the rotational direction.

In a gravure printing plate according to a preferred embodiment of the present invention, the second protrusion may include a first portion that extends in the axial direction and one or a plurality of second portions that extend from the first portion toward an upstream side in the rotational direction.

According to a preferred embodiment of the present invention, a gravure printing plate is able to be provided with which a conductive paste layer including a plurality of connected portions of different widths is able to be suitably printed.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
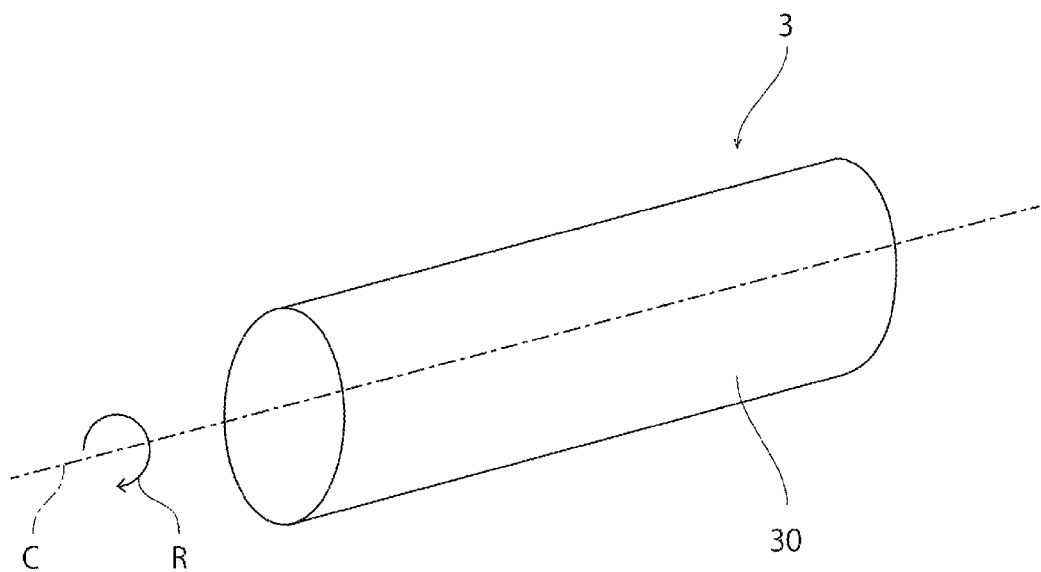
FIG. 1 is a schematic perspective view of a gravure printing plate according to a preferred embodiment of the present invention.

Hereafter, examples of preferred embodiments of the present invention will be described. However, the following preferred embodiments are merely illustrative examples. The present invention is in no way limited to the following preferred embodiments.

In addition, in the drawings referred to in the description of preferred embodiments and so forth, members having the same or substantially the same functions are referred to using the same symbols. In addition, the drawings referred to in the description of preferred embodiments and so forth are schematic drawings. The dimensional ratios and so forth of bodies drawn in the drawings may differ from the actual dimensional ratios and so forth of the bodies. The dimensional ratios and so forth of bodies may also differ from drawing to drawing. The specific dimensional ratios and so forth of bodies should be determined by referring to the following description.

Figure 2:
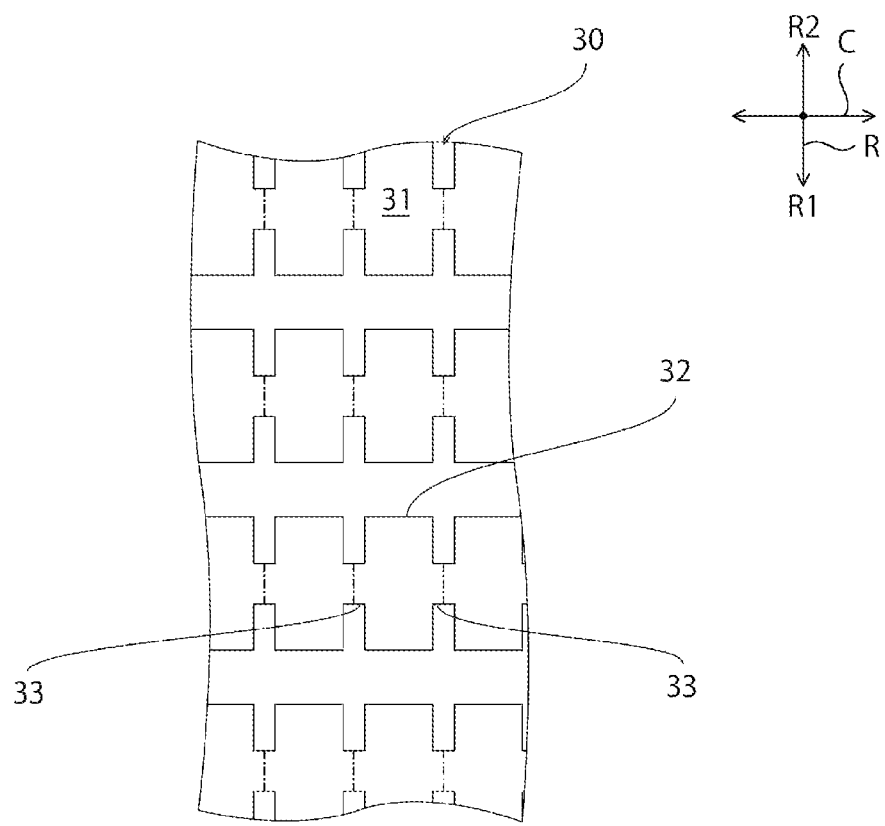
FIG. 2 is a schematic plan view of an outer surface of a gravure printing plate according to a preferred embodiment of the present invention.
Figure 3:
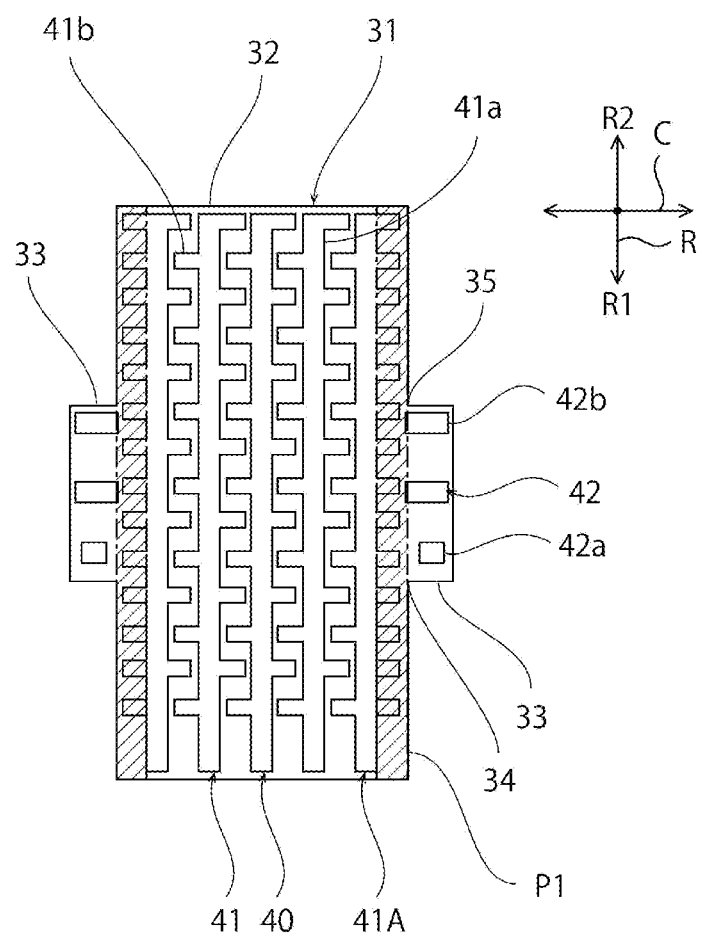
FIG. 3 is a schematic plan view of a recess in a preferred embodiment of the present invention.

FIG. 1 is a schematic perspective view of a gravure printing plate according to a preferred embodiment of the present invention. FIG. 2 is a schematic plan view of an outer surface of the gravure printing plate according to the present preferred embodiment. FIG. 3 is a schematic plan view of a recess in the present preferred embodiment.

A gravure printing plate 3 illustrated in FIG. 1 is for printing a conductive paste layer. The gravure printing plate 3 preferably has a cylindrical or substantially cylindrical shape. As illustrated in FIG. 2, a plurality of recesses 31, which are to be charged with a conductive paste, are located in an outer surface 30 of the gravure printing plate 3. The plurality of recesses 31 are provided in a matrix pattern extending in a rotational direction R and an axial direction C.

The recesses 31 each preferably have the same or substantially the same shape as a second inner electrode 12, which will be described later. Each recess 31 includes a first portion 32 and second portions 33. The first portion 32 preferably has a rectangular or substantially rectangular shape, for example. The first portion 32 extends in the rotational direction R. The second portions 33 each extend in the axial direction C from a portion of an edge of the first portion 32 that extends in the rotational direction R. The second portions preferably have a rectangular or substantially rectangular shape, for example.

Figure 4:
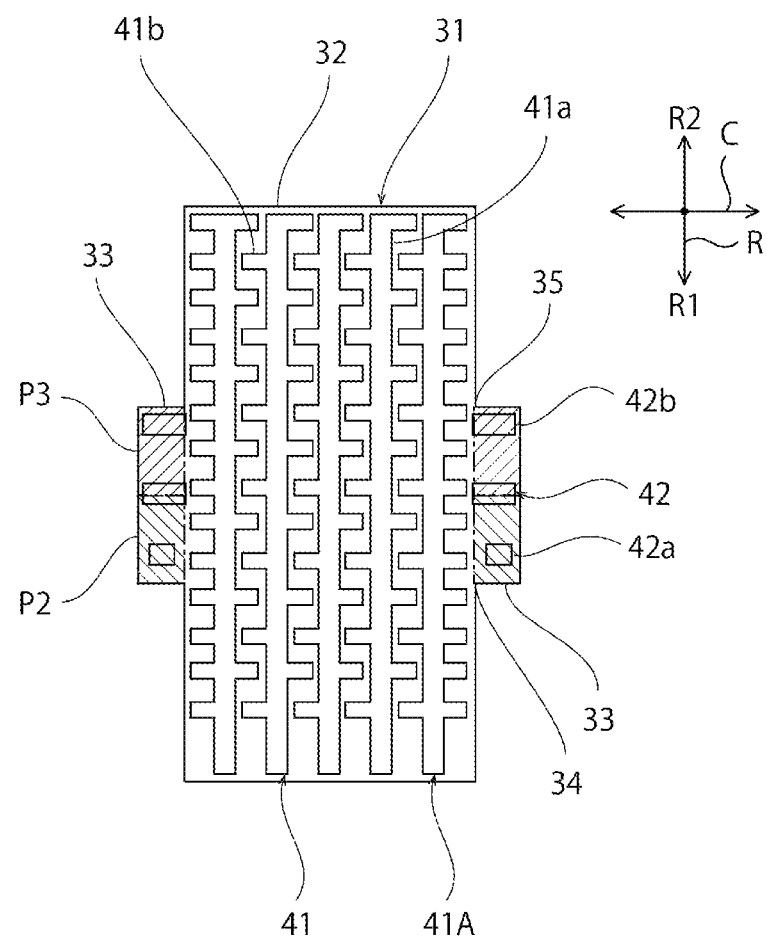
FIG. 4 is a schematic plan view of a recess in a preferred embodiment of the present invention.
Figure 5:
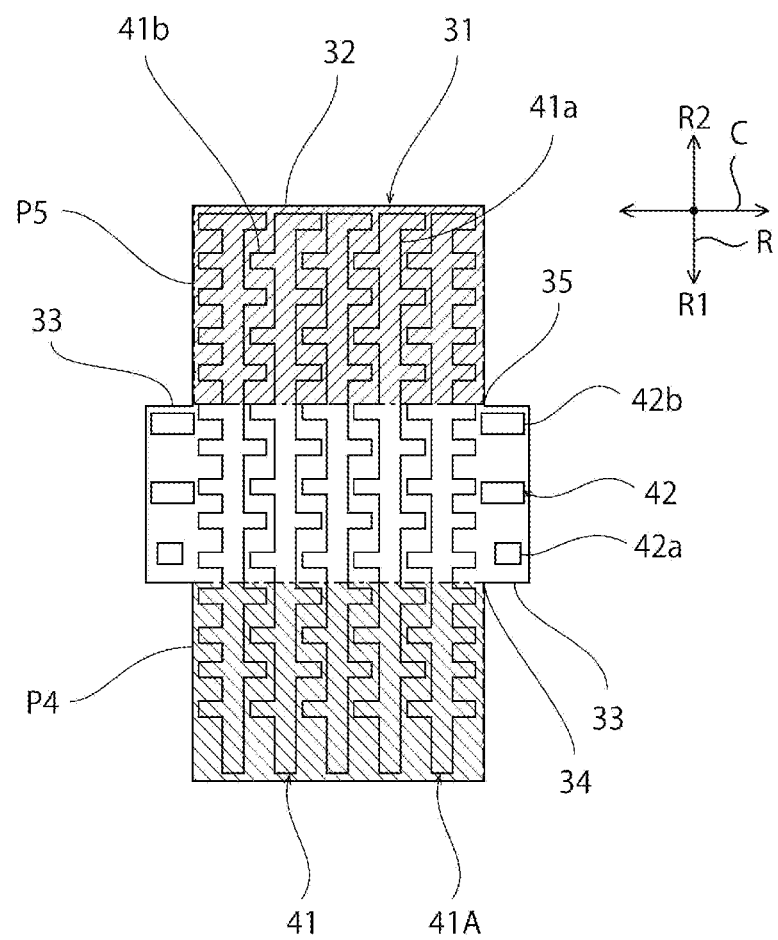
FIG. 5 is a schematic plan view of a recess in a preferred embodiment of the present invention.

As illustrated in FIG. 3, a protrusion 40 is provided inside each recess 31. This protrusion 40 controls the amount of conductive paste charged into the inside of the recess 31 by a blade and regulate a flow direction of the conductive paste charged into the recess 31. In FIG. 3, and FIGS. 4 and 5 which will be described later, portions shaded with hatching represent regions and do not represent cross sections.

The protrusion 40 is provided in both the first portion 32 and the second portions 33 of the recess 31. The protrusion 40 is not provided in connection portions 34, which are located on an upstream side R1 in the rotational direction R, among connection portions 34 and 35 between the first portion 32 and the second portions 33.

The protrusion 40 includes a plurality of protrusions. At least two or more first protrusions 41 are provided in the first portion 32 of the recess 31. The plurality of first protrusions 41 are arranged along the axial direction C with gaps therebetween. The plurality of first protrusions 41 each include a rectangular or substantially rectangular line-shaped portion 41a and a plurality of rectangular or substantially rectangular projecting portions 41b, for example. The line-shaped portion 41a extends in the rotational direction R. The line-shaped portion 41a is provided so as to extend along an upstream-side end portion and a downstream-side end portion of the first portion 32 in the rotational direction R. The plurality of projecting portions 41b project from the line-shaped portion 41a in the axial direction C.

At least two or more second protrusions 42 are provided in each second portion 33 of the recess 31. The plurality of second protrusions 42 each preferably have a rectangular or substantially rectangular shape. The plurality of second protrusions 42 are provided along the rotational direction R with gaps therebetween. The plurality of second protrusions 42 include first second protrusions 42a and second protrusions 42b. The first second protrusions 42a and the second protrusions 42b extend along the axial direction C. The first second protrusions 42a are positioned relatively toward the upstream side R1 in the rotational direction R and the second protrusions 42b are positioned relatively toward a downstream side R2 in the rotational direction R. The first second protrusions 42a are shorter than the second protrusions 42b. The second protrusions 42a do not reach the connection portions 34. In contrast, the second protrusions 42b do reach the connection portions 35.

Next, a method of manufacturing a multilayer ceramic capacitor, which is one type of multilayer ceramic electronic component, by using the gravure printing plate 3 will be described.

Figure 6:
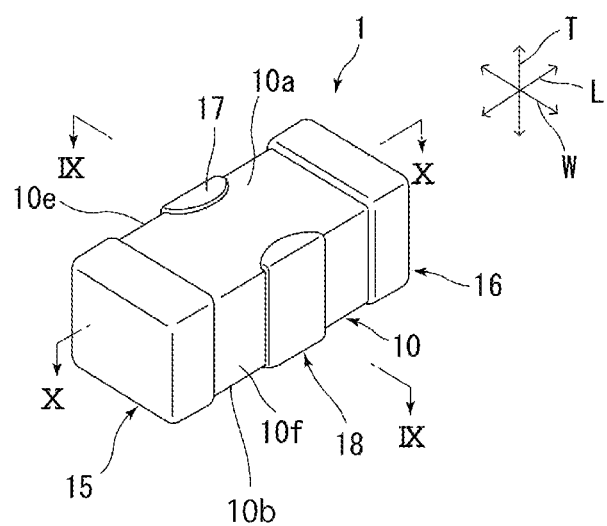
FIG. 6 is a schematic perspective view of a multilayer ceramic capacitor manufactured according to a preferred embodiment of the present invention.
Figure 7:
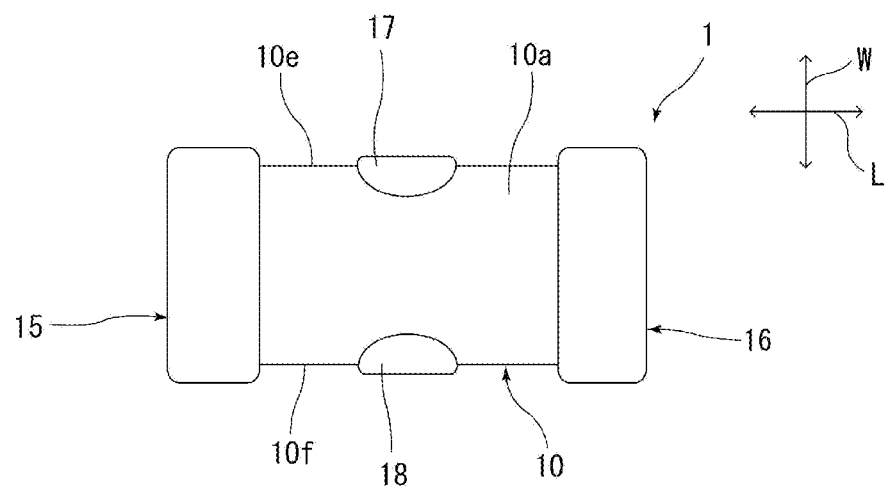
FIG. 7 is a schematic plan view of the multilayer ceramic capacitor manufactured according to a preferred embodiment of the present invention.
Figure 8:
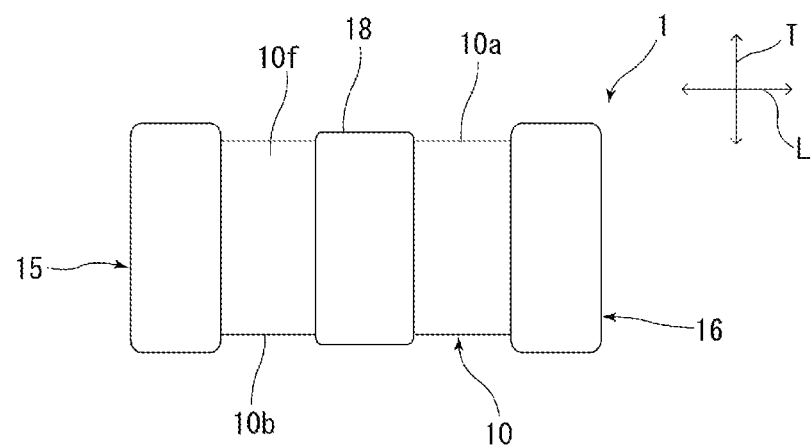
FIG. 8 is a schematic side view of the multilayer ceramic capacitor manufactured according to a preferred embodiment of the present invention.
Figure 9:
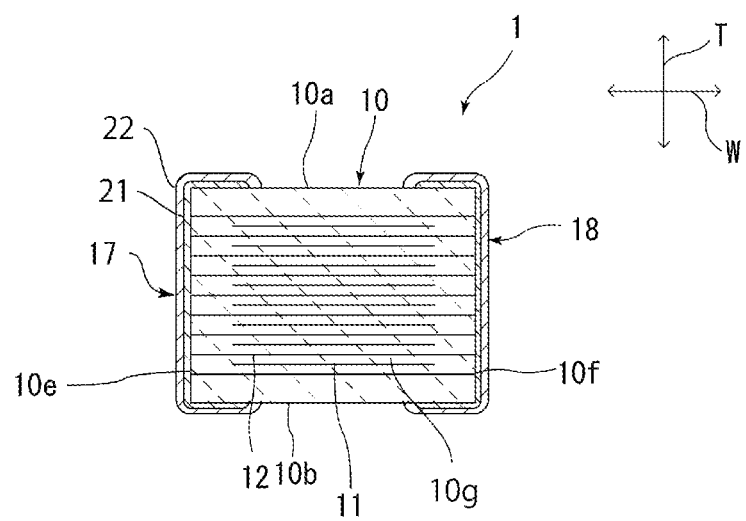
FIG. 9 is a schematic sectional view taken along line IX-IX in FIG. 6.
Figure 10:
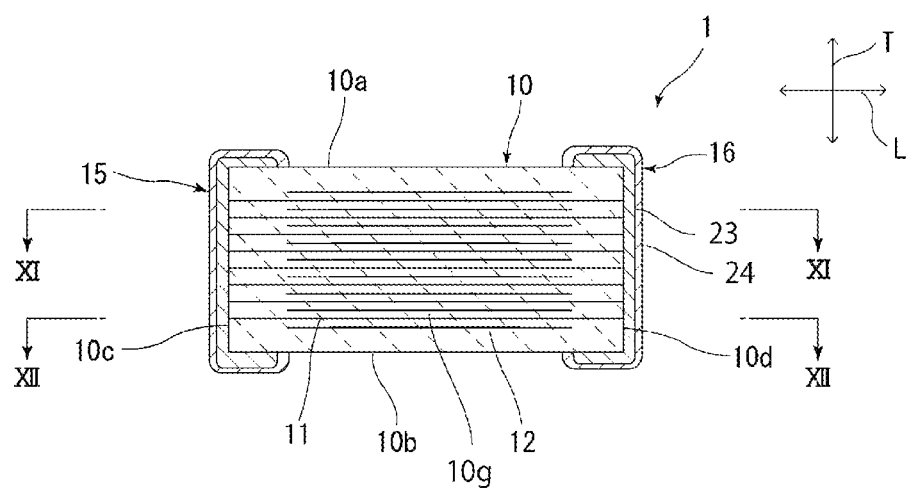
FIG. 10 is a schematic sectional view taken along line X-X in FIG. 6.
Figure 11:
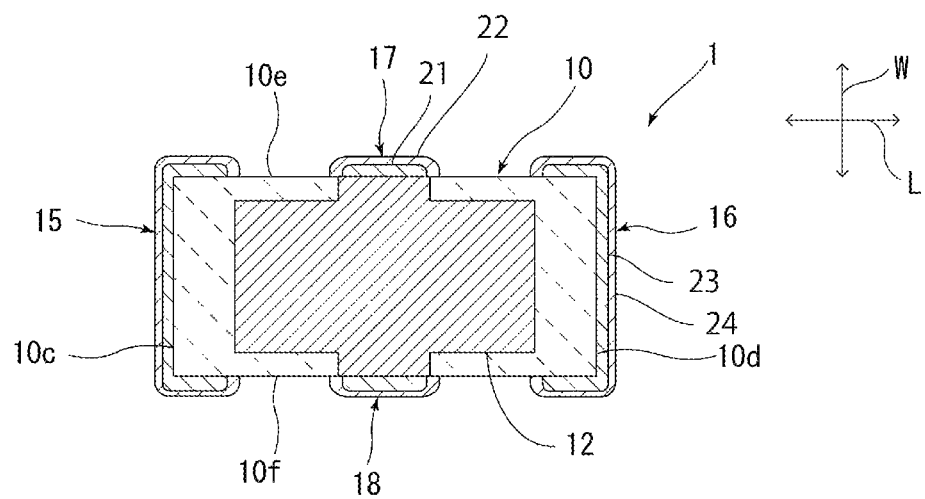
FIG. 11 is a schematic sectional view taken along line XI-XI in FIG. 10.
Figure 12:
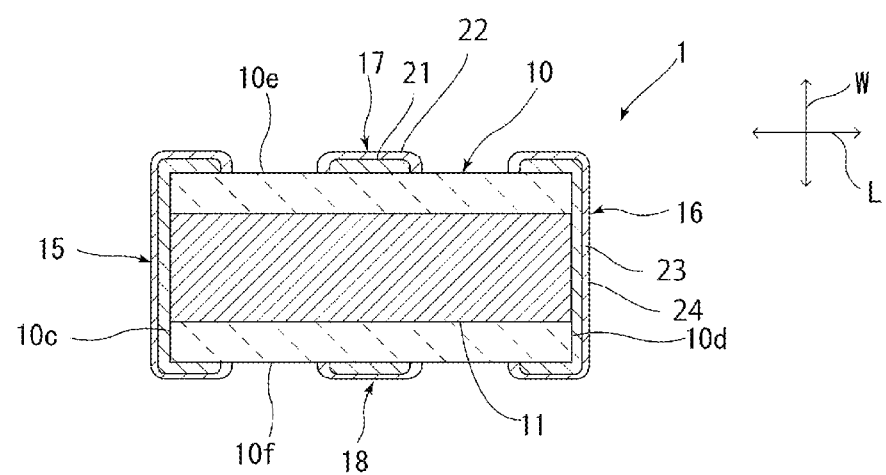
FIG. 12 is a schematic sectional view taken along line XII-XII in FIG. 10.

FIG. 6 is a schematic perspective view of a multilayer ceramic capacitor manufactured in this preferred embodiment. FIG. 7 is a schematic plan view of the multilayer ceramic capacitor manufactured in this preferred embodiment. FIG. 8 is a schematic side view of the multilayer ceramic capacitor manufactured in this preferred embodiment. FIG. 9 is a schematic sectional view taken along line IX-IX in FIG. 6. FIG. 10 is a schematic sectional view taken along line X-X in FIG. 6. FIG. 11 is a schematic sectional view taken along line XI-XI in FIG. 10. FIG. 12 is a schematic sectional view taken along line XII-XII in FIG. 10.

As illustrated in FIGS. 6 to 12, a ceramic capacitor 1 includes a capacitor body 10. The capacitor body 10 preferably has a rectangular or substantially rectangular parallelepiped shape, for example. Corner portions and edge portions of the capacitor body 10 may be provided in a chamfered shape or may have a rounded shape, for example. In addition, irregularities may be provided on main surfaces and side surfaces of the capacitor body 10.

The capacitor body 10 includes first and second main surfaces 10a and 10b, first and second side surfaces 10c and 10d, and third and fourth side surfaces 10e and 10f.

The first and second main surfaces 10a and 10b each extend in a width direction W, which is a first direction, and in a length direction L, which is a second direction. The length direction L is orthogonal to the width direction W. The first main surface 10a and the second main surface 10b oppose each other in a thickness direction T, which is a third direction. The thickness direction T is orthogonal to the length direction L and the width direction W.

In this preferred embodiment, an example is described in which the first direction is the width direction W and the second direction is the length direction L. However, the present invention is not limited to this configuration. For example, the first direction may be length direction L and the second direction may be the width direction W. In other words, the longitudinal direction of the capacitor body 10 may extend in the first direction or may extend in the second direction.

The first and second side surfaces 10c and 10d each extend in the width direction W, which is the first direction, and the thickness direction T, which is the third direction. The first side surface 10c and the second side surface 10d oppose each other in the length direction L.

The third and fourth side surfaces 10e and 10f each extend in the length direction L, which is the second direction, and the thickness direction T, which is the third direction. The third side surface 10e and the fourth side surface 10f oppose each other in the width direction W.

The capacitor body 10 is, for example, formed of a ceramic body composed of a dielectric ceramic. Hereafter, in this preferred embodiment, an example will be described in which the capacitor body 10 is formed of a dielectric ceramic.

Specific examples of the dielectric ceramic include $BaTiO_3$, $CaTiO_3$, $SrTiO_3$ and $CaZrO_3$. For example, a Mn compound, a Mg compound, a Si compound, an Fe compound, a Cr compound, a Co compound, a Ni compound or a rare earth compound may be added to the ceramic body.

As illustrated in FIGS. 9 and 10, first inner electrodes 11 and second inner electrodes 12 are provided inside the capacitor body 10. The first inner electrodes 11 and the second inner electrodes 12 oppose each other in the thickness direction T with ceramic portions 10g therebetween. Specifically, inside the capacitor body 10, a plurality of first inner electrodes 11 and a plurality of second inner electrodes are alternately arranged with gaps therebetween in the thickness direction T.

The first and second inner electrodes 11 and 12 may be formed of a metal such as Ni, Cu, Ag, Pd, Au or a Ag—Pd alloy. As illustrated in FIGS. 10 and 12, the first inner electrodes 11 are led out to the first side surface 10c and the second side surface 10d. The first inner electrodes 11 are electrically connected to a first signal terminal electrode 15 arranged on the first side surface 10c and to a second signal terminal electrode 16 arranged on the second side surface 10d. As illustrated in FIG. 6, the first signal terminal electrode 15 extends from the first side surface 10c onto the first and second main surfaces 10a and 10b and onto the third and fourth side surfaces 10e and 10f. The second signal terminal electrode 16 extends from the second side surface 10d onto the first and second main surfaces 10a and 10b and onto the third and fourth side surfaces 10e and 10f.

As illustrated in FIGS. 9 and 11, the second inner electrodes 12 extend to the third side surface 10e and the fourth side surface 10f. The second inner electrodes 12 are electrically connected to a first ground terminal electrode 17 arranged on the third side surface 10e and to a second ground terminal electrode 18 arranged on the fourth side surface 10f. As illustrated in FIG. 6, the first ground terminal electrode 17 extends from the third side surface 10e onto the first and second main surfaces 10a and 10b. The second ground terminal electrode 18 extends from the fourth side surface 10f onto the first and second main surfaces 10a and 10b.

The first ground terminal electrode 17 includes a first electrode layer 21 that is provided on the third side surface 10e and a second electrode layer 22 that is provided on the first electrode layer 21, and similarly the second ground terminal electrode 18 includes a first electrode layer 21 that is provided on the fourth side surface 10f and a second electrode layer 22 that is provided on the first electrode layer 21.

The first electrode layer 21 and the second electrode layer 22 each contain a glass, which contains Si, and a conductive material. In this preferred embodiment, specifically, the first and second electrode layers 21 and 22 preferably are fired electrode layers that are formed by firing a paste including a glass powder, which contains Si, and a conductive material. The conductive material may be formed of a metal such as Ni, Cu, Ag, Pd, Au or a Ag—Pd alloy.

The first and second ground terminal electrodes 17 and may each further include electrode layers other than the first and second electrode layers 21 and 22. The first and second ground terminal electrodes 17 and 18 may be, for example, each additionally provided with at least one plating film provided on the second electrode layer 22.

The first signal terminal electrode 15 includes a third electrode layer 23 that is provided on the first side surface 10c and a fourth electrode layer 24 that is provided on the third electrode layer 23, and similarly the second signal terminal electrode 16 includes a third electrode layer 23 that is provided on the 2rd side surface 10d and a fourth electrode layer 24 that is provided on the third electrode layer 23.

The third electrode layer 23 and the fourth electrode layer 24 each contain a glass, which contains Si, and a conductive material. In this preferred embodiment, specifically, the third and fourth electrode layers 23 and 24 are fired electrode layers that are formed by firing a paste including a glass powder, which contains Si, and a conductive material. The conductive material may be formed of a metal such as Ni, Cu, Ag, Pd, Au or a Ag—Pd alloy.

The first and second signal terminal electrodes 15 and may each further include electrode layers other than the third and fourth electrode layers 23 and 24. The first and second signal terminal electrodes 15 and 16 may be, for example, each additionally provided with at least one plating film provided on the fourth electrode layer 24.

Next, a non-limiting example of a method of manufacturing the multilayer ceramic capacitor 1 will be described.

First, ceramic green sheets containing a ceramic powder are prepared. For example, the ceramic green sheets can be manufactured by applying a ceramic paste containing a ceramic powder and so forth.

Next, conductive paste layers for forming the first and second inner electrode layers 11 and 12 are formed by applying a conductive paste onto the ceramic green sheets.

The conductive paste layers for forming the second inner electrodes 12 are applied using the gravure printing plate 3.

Next, a plurality of ceramic green sheets on which conductive paste layers have not been printed are stacked on top of one another such that the total thickness is about 20 μm or more and about 60 μm or less, on top of that, ceramic green sheets with a thickness of about 0.7 μm or more and about 1.2 μm or less on which conductive paste layers have been formed with a shape corresponding to that of the first inner electrodes 11 and ceramic green sheets with a thickness of about 0.7 μm or more and about 1.2 μm or less on which conductive paste layers have been formed with a shape corresponding to that of second inner electrodes 12 are alternately stacked such that the total number of layers is 230 or more and 240 or less, and then a plurality of ceramic green sheets on which conductive paste layers have not been printed are stacked such that the total thickness is about 20 μm or more and about 60 μm or less. After that, the obtained multilayer body is subjected to pressing in the thickness direction and a mother multilayer body is thus manufactured.

Next, the mother multilayer body is cut along imaginary cutting lines and thus a plurality of green ceramic multilayer bodies are manufactured from the mother multilayer body. Cutting of the mother multilayer body may be carried out by performing cutting with a dicing machine or by performing pressing and cutting.

After manufacture of the green ceramic multilayer bodies, edge portions and chamfers of edge portions or rounding chamfers and surfaces layers of the green ceramic multilayer bodies may be ground by barrel grinding or the like.

Next, the green ceramic multilayer bodies are fired. The firing temperature is able to be appropriately set in accordance with the types of ceramic material and conductive paste used.

Next, first conductive paste layers for forming the first and third electrode layers 21 and 23 are formed by applying a conductive paste containing a glass powder and a conductive material onto the ceramic multilayer bodies. It is preferable that the first conductive paste layers for forming the first electrode layers 21 be formed so as to be thicker than the first conductive paste layers for forming the third electrode layers 23.

In addition, second conductive paste layers for forming the second and fourth electrode layers 22 and 24 are formed on the first conductive paste layers by applying a conductive paste that has a lower content by mass of glass powder than the conductive paste for forming the first conductive paste layers.

Next, the first and second conductive paste layers are baked.

Finally, manufacture of the signal terminal electrodes 15 and 16 and the ground terminal electrodes 17 and 18 is completed by sequentially forming a Ni plating layer and a Sn plating layer in this order on the second and fourth electrode layers 22 and 24. Through the above-described steps, manufacture of the ceramic capacitor 1 is completed.

In this preferred embodiment, a non-limiting example was described in which the first signal terminal electrode defines a first terminal electrode, the second signal terminal electrode defines a second terminal electrode, the first ground terminal electrode defines a third terminal electrode and the second ground terminal electrode defines a fourth terminal electrode. However, the present invention is not limited to this configuration. For example, the first and second ground terminal electrodes may define the first and second terminal electrodes and the first and second signal terminal electrodes may define the third and fourth terminal electrodes.

When the recesses each include a first portion that extends in the rotational direction and second portions that extend in the axial direction from part of the first portion in the rotational direction, the conductive paste layer may not be suitably printed. Specifically, the second portions of the conductive paste layer may spread.

As illustrated in FIG. 3, in this preferred embodiment, the ratio of the area ratio of part of the second portion 33 excluding the second protrusions 42 to the second portion 33, to the area ratio of part of a portion P1 excluding the first protrusions 41 to the portion P1, the portion P1 being a part of the first portion 32 that is located closer to the second portion 33 than the line-shaped portion 41a of a first protrusion 41A located closest to the second portion 33 ((the area ratio of the part of the second portion 33 excluding the second protrusions 42 to the second portion 33)/(the area ratio of the part of the portion P1 excluding the first protrusions 41 to the portion P1)) is about 0.3 or more and about 0.9 or less, for example. Consequently, conductive paste is not excessively charged into the second portions 33. Therefore, the second inner electrodes 12 is formed with high form accuracy without the second portion 33 of the conductive paste layer spreading. As a result, the multilayer ceramic capacitor 1 having desired electrical characteristics is manufactured.

In addition, as illustrated in FIG. 4, in the gravure printing plate, the ratio of the area ratio of portion of a half P2 excluding the second protrusions 42 to the half P2, the half P2 being a portion of the second portion 33 located upstream of a center line in the rotational direction R, to the area ratio of a portion of a half P3 excluding the second protrusions 42 to the half P3, the half P3 being a portion of the second portion located downstream of the center line in the rotational direction R ((the area ratio of the portion of the half P2 excluding the second protrusions 42 to the half P2)/(the area ratio of the portion of the half P3 excluding the second protrusions 42 to the half P3)) is greater than about 1. Consequently, more conductive paste is charged into the upstream half P2 of the second portion 33 and as a result it is unlikely that there will be insufficient coverage in the printed portion and it is easy for the conductive paste to flow from the upstream side to the downstream side of the second portion and to flow from the second portion to the first portion. Therefore, spreading or insufficient coverage does not occur in the second portion or in a connection portion between the first portion and the second portion, and the second inner electrodes 12 is formed with higher form accuracy. As a result, the multilayer ceramic capacitor 1 having desired electrical characteristics is more suitably manufactured.

From the viewpoint of more effectively significantly reducing or preventing the occurrence of insufficient coverage in a portion of a conductive paste layer that is particularly susceptible to the occurrence of insufficient coverage and is printed with conductive paste charged into the upstream half P2 of the second portion 33, it is preferable that the ratio of the area ratio of the portion of the half P2 excluding the second protrusions 42 to the half P2, to the area ratio of the portion of the half P3 excluding the second protrusions 42 to the half P3 ((the area ratio of the portion of the half P2 excluding the second protrusions 42 to the half P2)/(the area ratio of the portion of the half P3 excluding the second protrusions 42 to the half P3)) be about 1.06 or more and about 4.00 or less, for example.

As illustrated in FIG. 5, in this preferred embodiment, the area ratio of part of a portion P4 excluding the first protrusions 41 to the portion P4, the portion P4 being part of the first portion 32 located upstream of the second portions 33 in the rotational direction R (the area of the part of the portion P4 excluding the first protrusions 41/the area of portion P4) is larger than the area ratio of part of a portion P5 excluding the first protrusions 41 to the portion P5, the portion P5 being part of the first portion 32 located downstream of the second portions 33 in the rotational direction R (the area of the part of the portion P5 excluding the first protrusions 41/the area of portion P5). Consequently, a larger amount of conductive paste is supplied to the portion P4. Therefore, it is possible to significantly reduce or prevent the occurrence of insufficient coverage in a portion that is printed with conductive paste charged into the portion P4 that is susceptible to insufficient coverage out of the conductive paste layer printed with conductive paste charged into the first portion 32.

From the viewpoint of more effectively significantly reducing or preventing the occurrence of insufficient coverage in the portion that is printed with conductive paste charged into the portion P4 that is susceptible to the occurrence of insufficient coverage out of the conductive paste layer printed with conductive paste charged into the first portion 32, it is preferable that the area ratio of the part of the portion P4 excluding the first protrusions 41 to the portion P4 (the area of the part of the portion P4 excluding the first protrusions 41/the area of the portion P4) be about 1.05 times or more and about 1.40 times or less the area ratio of the part of the portion P5 excluding the first protrusions 41 to the portion P5 (the area of the part of the portion P5 excluding the first protrusions 41/the area of the portion P5), for example.

In addition, as illustrated in FIG. 3, the protrusion 40 is not provided in the connection portions 34. Consequently, conductive paste charged into the second portions 33 readily flows into the connection portions of the first portion 32. Therefore, the occurrence of insufficient coverage in the opposing portions of the second inner electrodes 12 that oppose the first inner electrodes 11 and in lead out portions that are connected to the opposing portions is significantly reduced or prevented. That is, the second inner electrodes 12 is formed with high form accuracy. Therefore, the multilayer ceramic capacitor 1 having desired electrical characteristics is able to be manufactured.

From the viewpoint of forming the second inner electrodes 12 with even higher form accuracy, it is preferable that the second protrusions 42b reach the connection portions 35.

The area of the recesses, the area of the first portions, the area of the second portions and so forth are calculated by imaging the gravure printing plate using a metallurgical microscope, binarizing the obtained image data and discriminating between the recesses and other portions. Specifically, the following process is preferably performed. First, the gravure printing plate is imaged using a 10× metallurgical microscope. The obtained image data is binarized with a threshold of 90 and the recesses and other portions are discriminated from one another. Then, the areas of the discriminated recesses, first portions, second portions and so forth are calculated.

Figure 13:
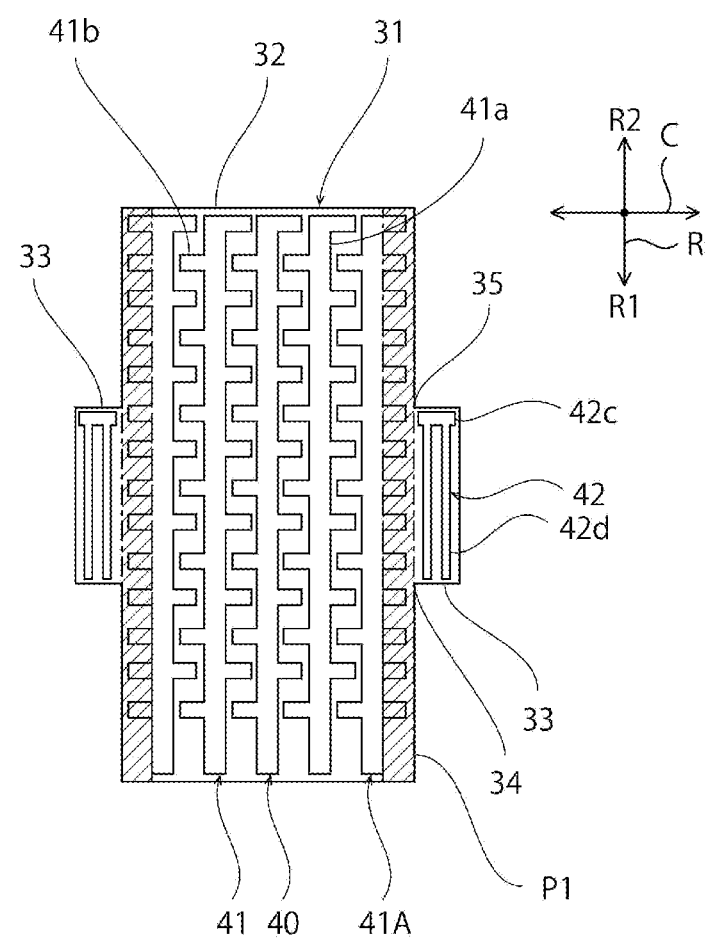
FIG. 13 is a schematic plan view of a recess in a modification of a preferred embodiment of the present invention.

FIG. 13 is a schematic plan view of a recess according to a modification of a preferred embodiment of the present invention.

In the above-described preferred embodiment of the present invention, an example was described in which the second protrusions 42 each preferably include a plurality of protrusions 42a and 42b that extend in the axial direction C. However, the present invention is not limited to this configuration. For example, as illustrated in FIG. 13, the second protrusions 42 may each include a line-shaped protrusion 42c that is located in a downstream portion of the second portion 33 and extends in the axial direction C and one or a plurality of line-shaped protrusions 42d that extend from the protrusion 42c toward the upstream side in the rotational direction R.

Hereafter, the present invention will be described in more detail on the basis of specific examples, but the present invention is in no way limited to the following experimental examples and can be appropriately modified.

Experimental Example 1

A Ni conductive paste (viscosity: 0.1 Pa·s or more and 1.0 Pa·s or less) was prepared as the conductive paste. Ceramic green sheets were manufactured by performing printing with the Ni conductive paste. Next, conductive paste layers having substantially the same shape as the second inner electrodes 12 were printed on the ceramic green sheets by using a gravure printing plate having substantially the same configuration as the gravure printing plate 3 described in the above preferred embodiment. A dimension of the first portion of the conductive paste layers in the rotational direction R was 964 μm and a dimension of the second portions of the conductive paste layers in the rotational direction R was 99 μm.

Next, the printed state of the conductive paste layers was checked under the conditions listed below using the following apparatus. The measurement apparatus was a non-contact three-dimensional shape measurement apparatus manufactured by Toray Engineering.

Comparative Examples 1 to 12, Examples 2 to 41

Multilayer ceramic capacitors were manufactured using substantially the same method as described in the above-described preferred embodiment by using gravure printing plates having the conditions listed in the following Tables 1 to 3. The method of manufacturing the ceramic green sheets is the same as in Example 1.

Evaluation 1

Using the same method of checking the printed state of the conductive paste layers described in Example 1, it was checked whether insufficient coverage or spreading had occurred in the second portions of the conductive paste layers manufactured in each example and comparative example. A case where insufficient coverage or spreading had not occurred is indicated by "O" and a case where insufficient coverage or spreading had occurred is indicated by "X". The results are listed in Tables 1 to 3.

Evaluation 2

Using the same method of checking the printed state of the conductive paste layers described in Example 1, the occurrence of insufficient coverage in connection portions between the first portion and the second portions of the conductive paste layers manufactured in each example and comparative example was checked. A case where insufficient coverage had not occurred is indicated by "O" and a case where insufficient coverage had occurred is indicated by "X". The results are listed in Tables 1 to 3.

Evaluation 3

Whether the direct-current resistance value of the multilayer ceramic capacitor manufactured in each example and comparative example satisfies a necessary value was checked. The direct-current resistance was measured by using the first ground terminal electrode 17 and the second ground terminal electrode 18 in four-terminal measurement. At this time, a case where the resistance did not exceed 40 mΩ, is indicated by "O" and a case where the resistance did exceed 40 mΩ, is indicated by "X". The results are listed in Tables 1 to 3.

Evaluation 4

Using the same method of checking the printed state of the conductive paste layers described in Example 1, the occurrence of spreading toward the upstream side in the second portions of the conductive paste layers manufactured in each example and comparative example was checked. A case where there was no spreading is indicated by "O" and a case where there was spreading is indicated by "X". The results are listed in Tables 1 to 3.

In Tables 1 to 3, "B2" represents the area ratio of the portion of the half P3 excluding the second protrusions 42 to the half P3 when the area ratio of the part of the portion P1 excluding the first protrusions 41 to the portion P1 is 1. "B1" represents the ratio of the area ratio of portion of the half P2 excluding the second protrusions 42 to the half P2 when the area ratio of the part of the portion P1 excluding the first protrusions 41 to the portion P1 is 1.

TABLE 1

|  | B2 | B1 | B1 + B2 | B1/B2 | EVALUATION 1 | 2 | 3 | 4 |
|---|---|---|---|---|---|---|---|---|
| COMPARATIVE EXAMPLE 1 | 0.10 | 0.90 | 1.00 | 9.00 | x | o | o | x |
| COMPARATIVE EXAMPLE 2 | 0.20 | 0.80 | 1.00 | 4.00 | x | o | o | x |
| COMPARATIVE EXAMPLE 3 | 0.30 | 0.70 | 1.00 | 2.33 | x | o | o | x |
| COMPARATIVE EXAMPLE 4 | 0.40 | 0.60 | 1.00 | 1.50 | x | o | o | x |
| COMPARATIVE EXAMPLE 5 | 0.50 | 0.50 | 1.00 | 1.00 | x | x | x | x |
| COMPARATIVE EXAMPLE 6 | 0.60 | 0.40 | 1.00 | 0.67 | x | x | x | x |
| EXAMPLE 2 | 0.15 | 0.75 | 0.90 | 5.00 | o | o | o | x |
| EXAMPLE 3 | 0.18 | 0.72 | 0.90 | 4.00 | o | o | o | o |
| EXAMPLE 4 | 0.25 | 0.65 | 0.90 | 2.60 | o | o | o | o |
| EXAMPLE 5 | 0.30 | 0.60 | 0.90 | 2.00 | o | o | o | o |
| EXAMPLE 6 | 0.35 | 0.55 | 0.90 | 1.57 | o | o | o | o |
| EXAMPLE 7 | 0.40 | 0.50 | 0.90 | 1.25 | o | o | o | o |
| EXAMPLE 8 | 0.45 | 0.45 | 0.90 | 1.00 | o | x | x | o |
| EXAMPLE 9 | 0.50 | 0.40 | 0.90 | 0.80 | o | x | x | o |
| EXAMPLE 10 | 0.10 | 0.60 | 0.70 | 6.00 | o | o | o | x |
| EXAMPLE 11 | 0.11 | 0.59 | 0.70 | 5.36 | o | o | o | x |
| EXAMPLE 12 | 0.13 | 0.57 | 0.70 | 4.38 | o | o | o | x |
| EXAMPLE 13 | 0.14 | 0.56 | 0.70 | 4.00 | o | o | o | o |
| EXAMPLE 14 | 0.15 | 0.55 | 0.70 | 3.67 | o | o | o | o |
| EXAMPLE 15 | 0.20 | 0.50 | 0.70 | 2.50 | o | o | o | o |

TABLE 2

|  | B2 | B1 | B1 + B2 | B1/B2 | EVALUATION 1 | 2 | 3 | 4 |
|---|---|---|---|---|---|---|---|---|
| EXAMPLE 16 | 0.25 | 0.45 | 0.70 | 1.80 | o | o | o | o |
| EXAMPLE 17 | 0.28 | 0.42 | 0.70 | 1.50 | o | o | o | o |
| EXAMPLE 18 | 0.30 | 0.40 | 0.70 | 1.33 | o | o | o | o |
| EXAMPLE 19 | 0.34 | 0.36 | 0.70 | 1.06 | o | o | o | o |
| EXAMPLE 20 | 0.35 | 0.35 | 0.70 | 1.00 | o | x | x | o |
| EXAMPLE 21 | 0.37 | 0.33 | 0.70 | 0.89 | o | x | x | o |
| EXAMPLE 22 | 0.40 | 0.30 | 0.70 | 0.75 | o | x | x | o |
| EXAMPLE 23 | 0.45 | 0.25 | 0.70 | 0.56 | o | x | x | o |
| EXAMPLE 24 | 0.50 | 0.20 | 0.70 | 0.40 | o | x | x | o |
| EXAMPLE 25 | 0.06 | 0.34 | 0.40 | 5.67 | o | o | o | x |
| EXAMPLE 26 | 0.07 | 0.33 | 0.40 | 4.71 | o | o | o | x |
| EXAMPLE 27 | 0.08 | 0.32 | 0.40 | 4.00 | o | o | o | o |
| EXAMPLE 28 | 0.10 | 0.30 | 0.40 | 3.00 | o | o | o | o |
| EXAMPLE 29 | 0.15 | 0.25 | 0.40 | 1.67 | o | o | o | o |
| EXAMPLE 30 | 0.18 | 0.22 | 0.40 | 1.22 | o | o | o | o |
| EXAMPLE 31 | 0.20 | 0.20 | 0.40 | 1.00 | o | x | x | o |
| EXAMPLE 32 | 0.22 | 0.18 | 0.40 | 0.82 | o | x | x | o |
| EXAMPLE 33 | 0.25 | 0.15 | 0.40 | 0.60 | o | x | x | o |
| EXAMPLE 34 | 0.05 | 0.25 | 0.30 | 5.00 | o | o | o | x |
| EXAMPLE 35 | 0.06 | 0.24 | 0.30 | 4.00 | o | o | o | o |

TABLE 3

|  | B2 | B1 | B1 + B2 | B1/B2 | EVALUATION 1 | 2 | 3 | 4 |
|---|---|---|---|---|---|---|---|---|
| EXAMPLE 36 | 0.07 | 0.23 | 0.30 | 3.29 | o | o | o | o |
| EXAMPLE 37 | 0.09 | 0.21 | 0.30 | 2.33 | o | o | o | o |
| EXAMPLE 38 | 0.11 | 0.19 | 0.30 | 1.73 | o | o | o | o |
| EXAMPLE 39 | 0.13 | 0.17 | 0.30 | 1.31 | o | o | o | o |
| EXAMPLE 40 | 0.15 | 0.15 | 0.30 | 1.00 | o | x | x | o |
| EXAMPLE 41 | 0.17 | 0.13 | 0.30 | 0.76 | o | x | x | o |
| COMPARATIVE EXAMPLE 7 | 0.02 | 0.18 | 0.20 | 9.00 | x | x | x | o |
| COMPARATIVE EXAMPLE 8 | 0.04 | 0.16 | 0.20 | 4.00 | x | x | x | o |
| COMPARATIVE EXAMPLE 9 | 0.06 | 0.14 | 0.20 | 2.33 | x | x | x | o |
| COMPARATIVE EXAMPLE 10 | 0.08 | 0.12 | 0.20 | 1.50 | x | x | x | o |
| COMPARATIVE EXAMPLE 11 | 0.10 | 0.10 | 0.20 | 1.00 | x | x | x | o |
| COMPARATIVE EXAMPLE 12 | 0.12 | 0.08 | 0.20 | 0.67 | x | x | x | o |

Examples 42 to 48

Ceramic green sheets were manufactured by using gravure printing plates having substantially the same conditions as the gravure printing plate of Example 18 and the conditions listed in Table 4 below.

In Table 4, "C" represents the area ratio of the part of the portion P5 excluding the first protrusions 41 to the portion P5 ((area of the part of the portion P5 excluding the first protrusions 41)/(the area of the portion P5)) when the area ratio of the part of the portion P4 excluding the first protrusions 41 to the portion P4 ((the area of the part of the portion P4 excluding the first protrusions 41)/(the area of the portion P4)) is 1.

Evaluation 5

Using the same method of checking the printed state of the conductive paste layers as in Example 1, it was checked whether spreading had occurred in the first portion. A case where spreading had not occurred is indicated by "O" and a case where spreading had occurred is indicated by "X". The results are illustrated in Table 4.

Evaluation 6

Using the same method of checking the printed state of the conductive paste layers as in Example 1, it was checked whether insufficient coverage had occurred in the upstream portion of the first portion. A case where insufficient coverage had not occurred is indicated by "O" and a case where insufficient coverage had occurred is indicated by "X". The results are illustrated in Table 4.

TABLE 4

|  | C | EVALUATION 5 | EVALUATION 6 |
|---|---|---|---|
| EXAMPLE 42 | 0.80 | O | × |
| EXAMPLE 43 | 0.90 | O | × |
| EXAMPLE 44 | 1.00 | O | × |
| EXAMPLE 45 | 1.05 | O | O |
| EXAMPLE 46 | 1.20 | O | O |
| EXAMPLE 47 | 1.30 | O | O |
| EXAMPLE 48 | 1.40 | O | O |

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A gravure printing plate comprising:
an outer circumferential surface;
a recess in the outer circumferential surface having a structure into which a conductive paste is to be charged;
wherein
the recess includes:
a first portion extending in a rotational direction; and
a second portion that extends in an axial direction from a portion of an edge of the first portion extending in the rotational direction; wherein
at least two or more first protrusions, which each include a line-shaped portion that extends in the rotational direction, are provided inside the first portion, and a second protrusion is provided inside the second portion; and
a ratio of an area ratio of part of the second portion excluding the second protrusion to the second portion, to the area ratio of part of the first portion excluding the first protrusions to the first portion, at a portion of the first portion that is located closer to the second portion than the line-shaped portion of the first protrusion located closest to the second portion, is about 0.3 or more and about 0.9 or less.

2. The gravure printing plate according to claim 1, wherein a ratio of an area ratio of a portion of an upstream half excluding the second protrusion to the upstream half, the upstream half being half of the second portion located upstream of a center line in the rotational direction, to the area ratio of a portion of a downstream half excluding the second protrusion to the downstream half, the downstream half being half of the second portion located downstream of the center line in the rotational direction is greater than 1.

3. The gravure printing plate according to claim 2, wherein the ratio of the area ratio of the part of the upstream half excluding the second protrusion to the upstream half, the upstream half being the half of the second portion located upstream of a center line in the rotational direction, to the area ratio of the part of the downstream half excluding the second protrusion to the downstream half, the downstream half being the half of the second portion located downstream of the center line in the rotational direction is 4 or less.

4. The gravure printing plate according to claim 1, wherein the second protrusion includes a plurality of protrusions that extend in the axial direction and are arranged in the rotational direction.

5. The gravure printing plate according to claim 1, wherein the second protrusion includes a first portion that extends in the axial direction and one or a plurality of second portions that extend from the first portion toward an upstream side in the rotational direction.

6. The gravure printing plate according to claim 1, wherein the first portion has a rectangular or substantially rectangular shape.

7. The gravure printing plate according to claim 1, wherein the second portion has a rectangular or substantially rectangular shape.

8. The gravure printing plate according to claim 1, wherein a connection portion is provided between the first portion and the second portion.

9. The gravure printing plate according to claim 8, wherein the at least two or more first protrusions do not extend into the connection portion.

10. The gravure printing plate according to claim 8, wherein the second protrusion includes a plurality of second protrusions, some of the second protrusions extend into the connection portion and some of the second protrusions do not extend into the connection portion.

11. The gravure printing plate according to claim 1, wherein the line-shaped portion and the second protrusion of each of the at least two or more first protrusions are rectangular or substantially rectangular.

12. The gravure printing plate according to claim 1, wherein a ratio of an area ratio of a portion of an upstream half excluding the second protrusion to the upstream half, the upstream half being half of the second portion located upstream of a center line in the rotational direction, to the area ratio of a portion of a downstream half excluding the second protrusion to the downstream half, the downstream half being half of the second portion located downstream of the center line in the rotational direction is about 1.06 or more and about 4.00 or less.

13. The gravure printing plate according to claim 1, wherein the second protrusion includes a line-shaped protrusion that is located in a downstream portion of the second portion and extends in the axial direction and one or a plurality of line-shaped protrusions that extend from the first portion toward an upstream side in the rotational direction.

14. A method of manufacturing a multilayer ceramic electronic component using the gravure printing plate according to claim 1.

* * * * *